(12) United States Patent
Nortrup

(10) Patent No.: US 6,670,997 B1
(45) Date of Patent: Dec. 30, 2003

(54) AUTODETERMINATION OF APPROPRIATE TELEVISION SIGNAL STANDARD IN A TELEVISION SIGNAL RECEIVER

(75) Inventor: Kevin Eugene Nortrup, Fairland, IN (US)

(73) Assignee: Thomson Licensing S.A., Boulogne (FR)

( * ) Notice: Subject to any disclaimer, the term of this patent is extended or adjusted under 35 U.S.C. 154(b) by 419 days.

(21) Appl. No.: 09/713,171

(22) Filed: Nov. 15, 2000

(51) Int. Cl.[7] .................................................. H04N 5/46
(52) U.S. Cl. ....................... 348/558; 348/555; 348/730
(58) Field of Search .............................. 348/555, 554, 348/558, 569, 730; H04N 5/46, 5/50, 5/63

(56) References Cited

U.S. PATENT DOCUMENTS

| | | | |
|---|---|---|---|
| 4,309,719 A | 1/1982 | Hinn | 348/555 |
| 4,414,563 A | 11/1983 | Juhnke et al. | 348/555 |
| 4,688,082 A | 8/1987 | Kato | 348/555 |
| 4,763,193 A | * 8/1988 | DeVilbiss | 348/555 |
| 5,267,024 A | 11/1993 | Murayama | 348/643 |
| 5,557,337 A | 9/1996 | Scarpa | 348/558 |

* cited by examiner

*Primary Examiner*—Sherrie Hsia
(74) *Attorney, Agent, or Firm*—Joseph S. Tripoli; Robert D. Shedd

(57) ABSTRACT

A television signal receiver, especially a satellite receiver, operable to receive and process incoming television signals, automatically determines which television signal standard to utilize for its output based on a parameter of the electrical power supply or supplied electricity. Frequency and voltage of the electrical power are measurable parameters that may be used to determine whether the NTSC or PAL (PAL-M or PAL-N) television signal standard is more probable as the local preference and automatically causes the television receiver to code received television signals in that format for output. The present invention utilizes the principle that the local television standard coincides in some manner with the local power line frequency and voltage.

10 Claims, 4 Drawing Sheets

AUTODETERMINATION OF APPROPRIATE TELEVISION SIGNAL STANDARD IN A TELEVISION SIGNAL RECEIVER

FIELD OF THE INVENTION

The present invention relates to receivers for television signals and, more particularly, to a television signal receiver capable of selecting a television standard appropriate for use in a particular television standard region.

BACKGROUND OF THE INVENTION

There are a number of different types of television broadcasting systems or standards used throughout the world, such as PAL, SECAM, and NTSC. The various standards have different features and/or peculiarities that make them incompatible relative to each other. Because of the differences between the various standards, it is not possible to receive and/or view television signals on a television receiver that processes a standard which is different from the standard of the received television signals. Fortunately, a particular standard is used throughout a particular region or area. As such, televisions are typically manufactured for a particular region and thus include processing circuitry only for the particular television signal standard for that region.

In view of the above, televisions have been developed that are able to receive and process television signals of different standards, for example, see U.S. Pat. Nos. 4,309,719 entitled "Dual Standard PAUSECAM Receiver Circuitry"; 4,414,563 entitled "television Receiver Circuit Arrangement for Identifying the Standard"; 4,688,082 entitled "Multi-System Television Receiver"; and 5,267,024 entitled "Multiple Systems Adaptive Television Receiver". However, in each case, the prior art utilizes parameters of the received television signal to select and change the processing from one television signal standard to another television signal standard.

One difference between the various television standards is the number of horizontal scan lines. Since the number of horizontal scan lines is different for each standard, it is usually not possible to select the appropriate television standard by an on-screen display (OSD) feature or a menu structure since a mismatch between the signal standard of the outputted television signal and the signal standard processing mode of the television can prevent a readable display from being shown on the television.

With respect to television signals emanating from a satellite, the satellite television signals are typically digital (i.e. digitally modulated analog signals) and thus are not encoded with respect to any particular television signal standard.

In view of the above, it is desirable to have a television signal receiver that is capable of automatically determining the television standard in use at a particular location.

SUMMARY OF THE INVENTION

The present invention is a television signal receiver operable to receive and process a television signal and output the television signal in one of a plurality of television signal standards or formats corresponding to a local television standard. The television signal receiver utilizes a parameter of the electricity supplied (coupled to) the television signal receiver in order to aid in the determination of which television signal standard to use for processing/modulating the received television signal.

In one form, the television signal receiver is a satellite receiver operable to receive satellite broadcast television signals and convert the television signals into the NTSC or PAL standard depending on the local preference. A frequency/period or voltage characteristics (parameters) of the electricity supply for the satellite receiver is ascertained and used in order to make a determination as to which television standard to use for processing/modulating and outputting the television signal.

In a case where there may be more than one frequency/period of electricity or power in use at a particular location, a supplemental determinator of standards may be used in conjunction with the use of electricity parameters. The supplemental determinator may be an on-screen display (OSD) that allows a user to choose between similar standards when the exact standard cannot be determined from the power-line (electricity) parameters.

The OSD may be displayed when particular characteristics of the electricity are initially determined. This typically occurs in an area where different voltages and/or frequencies are available or in use. When this occurs, the television standard that is utilized is similar to the television standard that is not utilized (e.g. NTSC and PAL-M). Therefore the OSD may be displayable.

In another form, the present invention is a television signal processing apparatus. The television signal processing apparatus includes a plurality of video signal processing paths or circuitry each of which provides television signal processing according to a respective one of a plurality of television signal standards. Means for determining a parameter (e.g. frequency or voltage characteristics) of a source of electrical operating power of the television signal processing apparatus is provided. Means for generating a control signal representative of the parameter of the source of electrical operating power of the television signal processing apparatus is also provided. The television signal processing apparatus further includes means responsive to the control signal for selecting one of the plurality of video signal processing paths for processing of an input television signal.

In yet another form, the present invention is a television signal processing apparatus that includes processing circuitry configured to receive a television signal, a modulator in communication with the processing unit and configured to provide television signal processing of the received television signal according to a respective one of a plurality of television standards, and electricity parameter determination circuitry in communication with a source of AC electricity and configured to provide a first signal to the processing circuitry indicative of a parameter of the supplied AC electricity. The processing circuitry is configured to provide a control signal to the modulator for selecting a particular one of the plurality of television standards in accordance with the first signal.

In still another form, the present invention is a method for processing a television signal input to a television signal processing apparatus. The method includes the steps of: a) determining a parameter of a supply of AC operating power of the television signal processing apparatus; b) generating a control signal corresponding to a parameter of the source of AC operating power of the television signal processing apparatus; and c) selecting one of a plurality of video signal processing paths for processing the input television signal in response to the control signal with each of the plurality of video signal processing paths providing television signal processing according to a respective one of a plurality of television signal standards.

BRIEF DESCRIPTION OF THE DRAWINGS

Reference to the following description of the present invention should be taken in conjunction with the accompanying drawings, wherein.

Corresponding reference characters indicate corresponding parts throughout the several views.

DETAILED DESCRIPTION OF THE INVENTION

Figure 1:
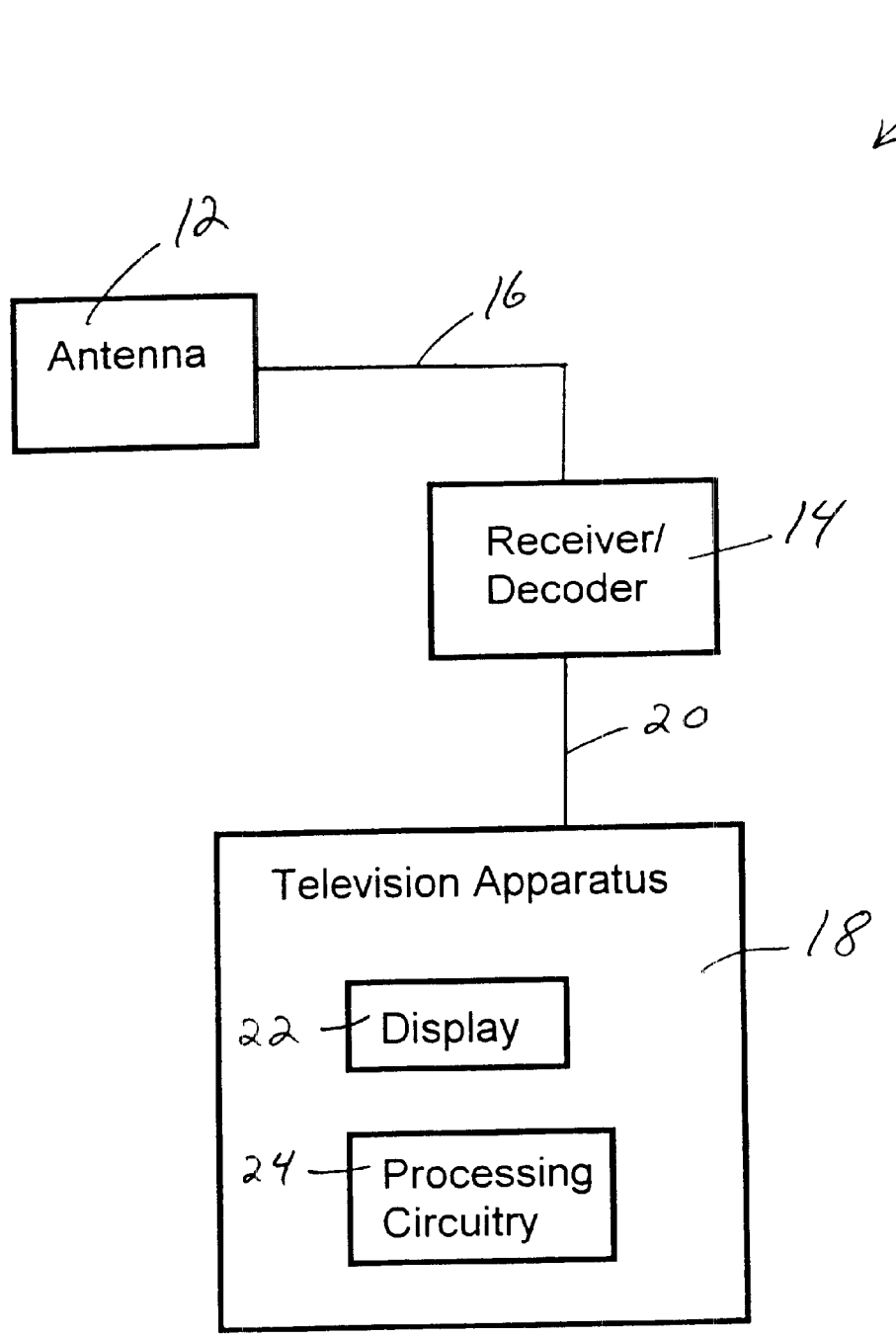
FIG. 1 is a block diagram of an exemplary system in which the present invention may be utilized.

With reference to FIG. 1, there is depicted a system, generally designated 10, in which the present invention may be utilized. It should initially be appreciated that the system 10 and the various components thereof are only exemplary of an environment/application in which the present invention may be utilized. Therefore, it should be understood that components and/or systems other than those particularly shown and described herein may utilize the present principles.

The system 10 includes a receiver/decoder 14 (collectively and hereinafter "receiver") that is adapted to receive and process television signals or transmissions (collectively hereinafter "television signals") from any source. The television signals may be received by an antenna, dish, or the like 12 and forwarded to the receiver 14 via a communication line or cable 16. The television signals may be digital and/or analog and thus, the antenna 12 is of a type to receive either or both digital and/or analog television signals. It should be appreciated that devices other than an antenna or dish may provide or receive television signals for the receiver 14. The antenna 12 is thus representative of any device capable of receiving or supplying television signals. The antenna 12 may also represent a source of television signals such as cable television (CATV) or the like.

The receiver 14 receives and processes the television signals as described below, and forwards them to a television apparatus 18 via a communication line or cable 20. The television apparatus 18 may or may not include an integral display 22, but typically includes appropriate processing circuitry and/or logic 24 to process the television signals. The television apparatus 18 is adapted to display the processed television signals on an integral display 22 or provide the processed television signals to a separate display (or other type of component), and provide other television functions such as are known in the art.

The television apparatus 18 represents all types of televisions, television apparatuses, and/or other types of components or devices (collectively "television apparatus") capable of receiving, processing, outputting, and/or utilizing television signals. As well, it should be appreciated that the television apparatus 18 is typically able to utilize only television signals that are coded according to a particular television signal standard, such as NTSC, SECAM, and PAL (including PAL-M, PAL-N, and other PAL standards; collectively "PAL"). Therefore, the television signals from the receiver 14 must be in a television signal standard that corresponds to the television signal standard processing capability of the television apparatus 18. The television apparatus 18 may incorporate the receiver 14. Thus, it should be appreciated that various configurations of receiver 14, television apparatus 18, and display 18 are contemplated.

Television apparatuses within a particular geographic area typically utilize the same television signal standard. Therefore, with typical terrestrial television signal transmission and/or cable television (CATV) television signal transmission, the television standard is known and the television signal is coded accordingly. In contrast to terrestrial and/or CATV television signals, television signals transmitted from a satellite, such as Direct Broadcast Satellite (DBS) systems, are not coded for a particular television standard. This is because the satellite is responsible for broadcasting its television signal or signals (including a plurality of channels) over a large geographic region. This large geographic region encompasses various geographic areas where the television standard may be different for each geographic area.

As an example, a particular satellite may be responsible for transmitting television signals to the whole of Central and/or South America. Television apparatuses in these regions typically use either the NTSC or PAL standard. Since the satellite does not code the television signal for a particular television standard, the receiver 14 (here a satellite receiver) must convert or code the television signal for the television apparatus 18 accordingly. In accordance with an aspect of the present invention, the receiver 14 includes the ability to code a received television signal according to a particular one of various television standards (e.g. NTSC, PAL, SECAM, etc.). This allows the manufacture of a single receiver that can be used in any geographic area irrespective of the television standard.

It should be appreciated that the coding of the television standard into the television signal is different than the coding (i.e. modulation) standard used by the satellite to transmit the television signals to earth. Hence the receiver 14 is operable to receive and decode (i.e. demodulate) the satellite signals regardless of geographic region or area.

Figure 2:
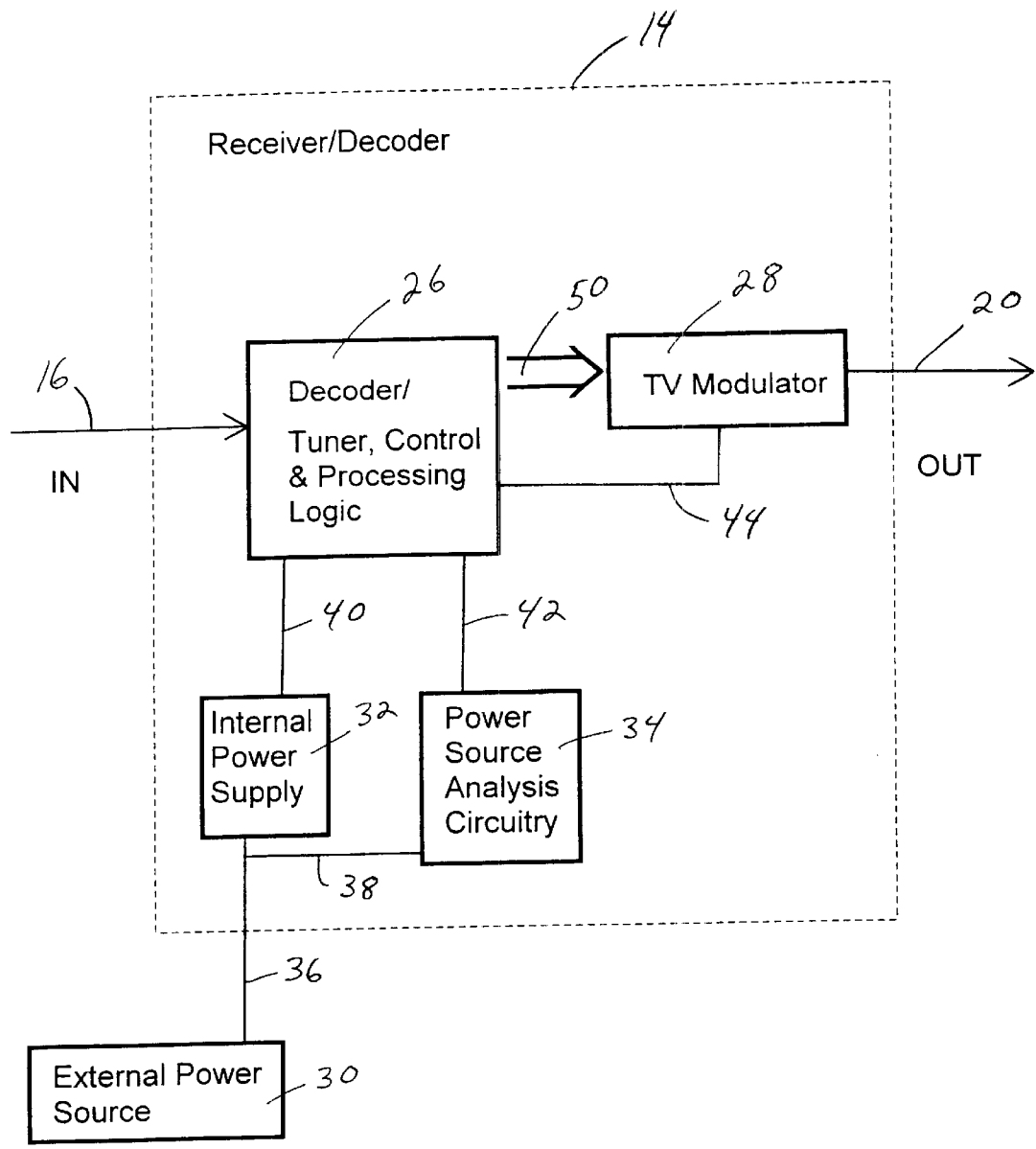
FIG. 2 is a block diagram of the receiver/decoder of the system of FIG.

Referring to FIG. 2, there is shown a block diagram of the receiver/decoder 14. The receiver 14 includes a television signal tuner, decoder/demodulator, and appropriate control and processing logic and/or circuitry 26 (collectively hereinafter "processing logic") to receive, tune, and process a television signal (such as a DBS television signal) from the input line 16. The television signal typically includes a plurality of channels of audio and video information. The processed television signal includes audio and video information that is forwarded by a bus or line 50 to a television modulator 28.

The television signal modulator 28 includes appropriate circuitry, logic, and/or paths to modulate the television signals from the processing logic 26 according to any one of a plurality of television standards and provide the television standard modulated television signal/channel on the output line 20. The particular television standard used by the modulator 28 is selected through a control signal that is provided to the modulator 28 by the processing logic 26 via a control line 44. The processing logic 26 selects a particular television standard as described below, and provides an appropriate control signal to the modulator 28 via the control line 44.

The selection of a particular television standard may be accomplished in a variety of ways. One of the ways is by automatic determination of the television standard. Another way is by semi-automatic determination of the television standard. In turn, these ways of determination of the television standard is accomplished by determining a parameter of the electricity supplied to the television signal processing device.

The receiver 14 requires electrical power (electricity) to operate and is thus in communication with a source or supply of electrical power/energy/electricity 30 via a power line or cord 36. The electricity is typically alternating current (AC) of a particular frequency, amplitude and amperage. The AC electricity also has other characteristics as are known in the art. The power line 30 is coupled to an internal power supply 32 that conditions and/or transforms the incoming electrical energy to appropriate levels or values (i.e. proper voltages and/or amperes) for use by the various components of the receiver 14. The internal power supply 32 is thus in communication with the processing logic 26 via a line 40. In accordance with an aspect of the present invention, the receiver 14 includes power source analysis circuitry/logic 34 that is coupled to the power source 30, here via an auxiliary line 38 that is tapped from or coupled to the power line 36. The power source analysis circuitry 34 is operable/adapted to obtain, calculate, and/or measure various parameters of the electrical energy from the external power source 30. One parameter is the frequency/period of the incoming AC electricity. Another parameter is voltage/amplitude of the incoming AC electricity. Parameters other than frequency/period and/or voltage/amplitude may be used.

Measurement or calculation of the frequency or period of the incoming AC electricity from the external power source 30 may be accomplished by an opto-isolator or other means of electrical isolation by the power source analysis circuitry 34. The optoisolator (or other means) is operable to obtain pulse-interval measurements of the incoming AC electricity in order to calculate the frequency/period thereof. The optoisolator may also be operable to provide measurement or calculation of the voltage or amplitude of the incoming AC electricity. The optoisolator or other means is operable to obtain pulse-width measurements to calculate the voltage/amplitude of the incoming AC electricity.

A threshold level for the optoisolator, properly set, allows for the accurate measurement and/or calculation of the various parameters. For example, if the optoisolator is set to a threshold level of 150 VDC, 120V RMS=170 Vpp @ 60 Hz to yield a 2.5 ms duration pulse occurring every 16.7 ms. A 240V RMS=340Vpp @ 50 Hz to yield a 7 ms pulse occurring every 20 ms. Thus, proper setting of the thresholds of the optoisolator allows pulse-length and pulse-interval information to indicate voltage and frequency of the incoming AC electricity.

The power source analysis circuitry 34 may measure or calculate either or both frequency/period and voltage/amplitude, as well as other parameters. The power source analysis circuitry 34 may also include wave-shaping circuitry and other measurement/processing circuitry as appropriate to provide a signal to the processing circuitry 26 regarding the frequency and/or voltage (or other parameters) of the incoming electrical energy from the external power source 30 via line 42. These and other parameters, information, data, or the like, may be passed from the power source analysis circuitry 34 to the processing circuitry 26 via the line 42.

In one form, the power source analysis circuitry 34 generates an isolated, digital version (e.g. samples) of the electrical energy for the processing logic 26 to use and determine the frequency or period of the incoming electrical energy and/or the voltage thereof. The frequency (or period) of the electrical energy is typically either 50 Hz (20 ms in duration) or 60 Hz (16+ms in duration) while the voltage is typically either 120V or 220V. The frequency and voltage information is used by the processing logic 26 to infer whether the probable local television broadcast/signal (and thus the television standard used by the television apparatus 18) has a 50 Hz vertical or 60 Hz vertical rate. A 50 Hz vertical rate (or frequency/period of the electricity) corresponds to the PAL-N standard, while a 60 Hz vertical rate (or frequency/period of the electricity) corresponds to either the PAL-M standard or the NTSC standard depending on the voltage of the electricity. A line voltage of 220V at 60 Hz indicates the PAL-M standard, while a line voltage of 120V at 60 Hz indicates the NTSC standard.

In one form, when the incoming/supplied electrical energy has a frequency of 50 Hz and/or a voltage of 220, the processing logic 26 provides a control signal to the modulator 28 via the control line 44 to use the PAL-N standard. When the incoming/supplied electrical energy has a frequency of 60 Hz and a voltage of 220, the processing logic 26 provides a control signal to the modulator 28 via the control line 44 to use the PAL-M standard, else if a voltage of 120 is detected, the processing logic 26 provides a control signal to the modulator 28 via the control line 44 to use the NTSC standard. Once the particular standard is determined, an initial configuration for re-encoding the television signals is established by the receiver 14.

The control signal from the processing circuitry 26 determines or selects the processing circuitry or path, corresponding to a particular television standard, the television signal will take through the modulator 28 in order to process, encode, and/or modulate the television signal received by the modulator 28 from the processing circuitry 26. The control signal may be provided at every power-up of the receiver 14, or stored in memory after an initial set-up. As well, the modulator 28 may remain in a particular television standard state or mode after the initial set-up and periodically checked. Various schemes are possible.

Operation

Figure 3:
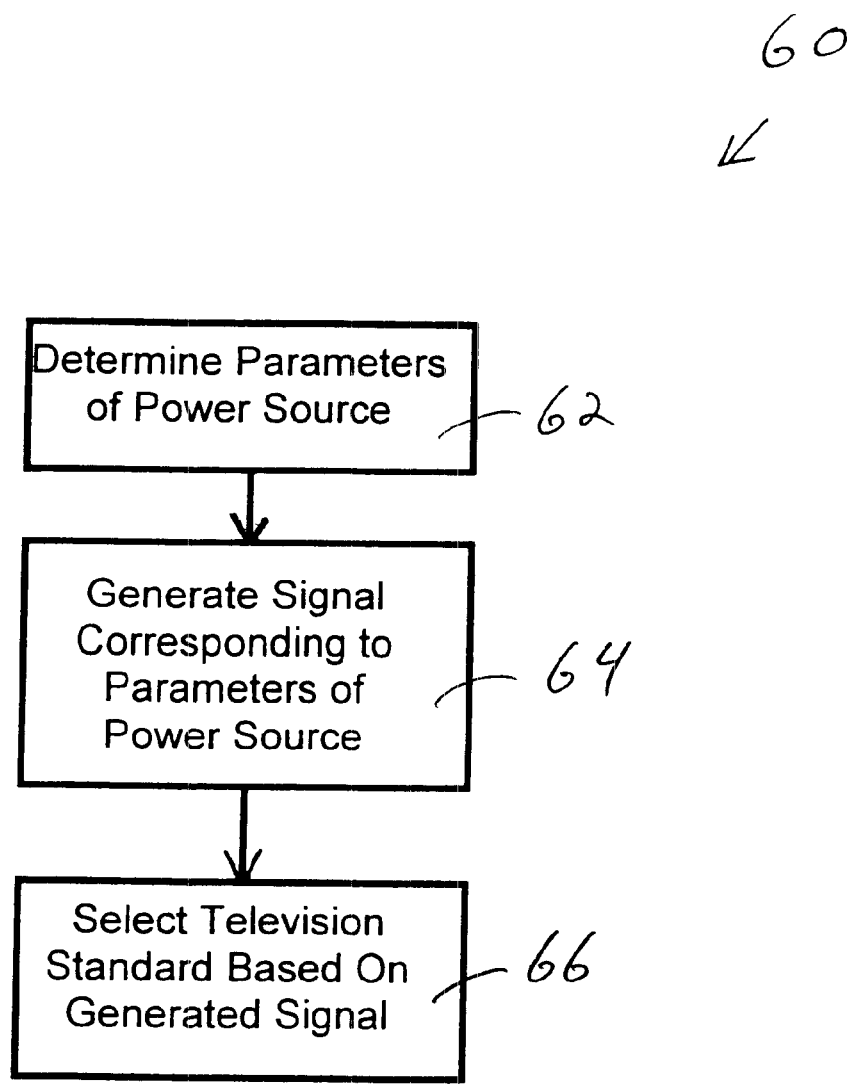
FIG. 3 is a flowchart of an exemplary method for carrying out the principles of the present invention.

Next, a flowchart, generally designated 60, depicted in FIG. 3, is referenced to describe a method of use in accordance with the principles presented herein. The instructions for the present method are stored in and executed by the processing circuitry/logic 26. It should be appreciated that the flowchart 60 and the method described herein in association with the flowchart 60 is only exemplary of a method to carry out the principles presented herein.

The software routines (i.e. instructions) may be implemented by any means as is known in the art, and in any programming language. Various programming approaches such as procedural, object oriented, or artificial intelligence techniques may be employed.

The steps of the flowchart 60 may be implemented by one or more software routines, processes, subroutines, modules, etc. It should be appreciated that the flowchart 60 is illustrative of merely a broad logical flow of a method in accordance with the principles of the present invention and that steps may be added to, or taken away from, the flowchart 60 without departing from the scope of the present invention. Further, the order of execution of steps in the flowchart 60 may be changed without departing from the scope of the present invention. Additional considerations in implementing the method described by the flowchart 60 in software may dictate changes in the selection and order of steps. Some considerations are event handling by interrupt driven, polled, or other schemes. A multiprocessing or multitasking environment could allow steps to be executed essentially concurrently.

The receiver/decoder 14, upon power-up, initially determines parameters (e.g. frequency and voltage) of a power source to which it is coupled and from which it derives its operating power, block 62, as described above. This is typically accomplished when the receiver/decoder 14 is plugged in (to an electricity outlet for example) for the first time, is unplugged and plugged back in, or when the receiver/decoder 14 has lost power and subsequently gains power, such by a power outage. It is also possible for a user to activate the sequence. In any case, the receiver/decoder 14 then generates a signal that corresponds to the parameters frequency of the operating power, block 64. Thereafter, the receiver/decoder 14 utilizes the generated signal to select a television standard, block 66. The receiver/decoder 14 then operates a mode according to the selected television standard.

The method described above with reference to FIG. 3 may be implemented in the following algorithm:

IF (50 Hz) && (220V) system=PAL_N
ELSEIF (60 Hz) && (220V) system=PAL_M
ELSE system=NTSC
ENDIF This algorithm, however, may not function entirely correctly in unusual cases where there may be more than one supplied voltage of electricity.

In some instances, such as in the country of Brazil in South America, electricity is supplied at 220V and 120V. The television standard, however, is PAL-M rather than NTSC. Thus, if 120V is detected and 60 Hz (50 Hz will correspond to PAL-N), the default setting of the NTSC standard according to the above algorithm will prevail. In this case, one form of the present invention provides for a supplemental manner of determining the television standard that manually assists in the automatic determination of the television standard to use. This may be accomplished by use of an on-screen display (OSD). Since NTSC and PAL-M share common line and field frequencies, differing only in their color encoding, OSD of an initial set-up menu or choice to choose between NTSC or PAL-M may be used.

Figure 4:
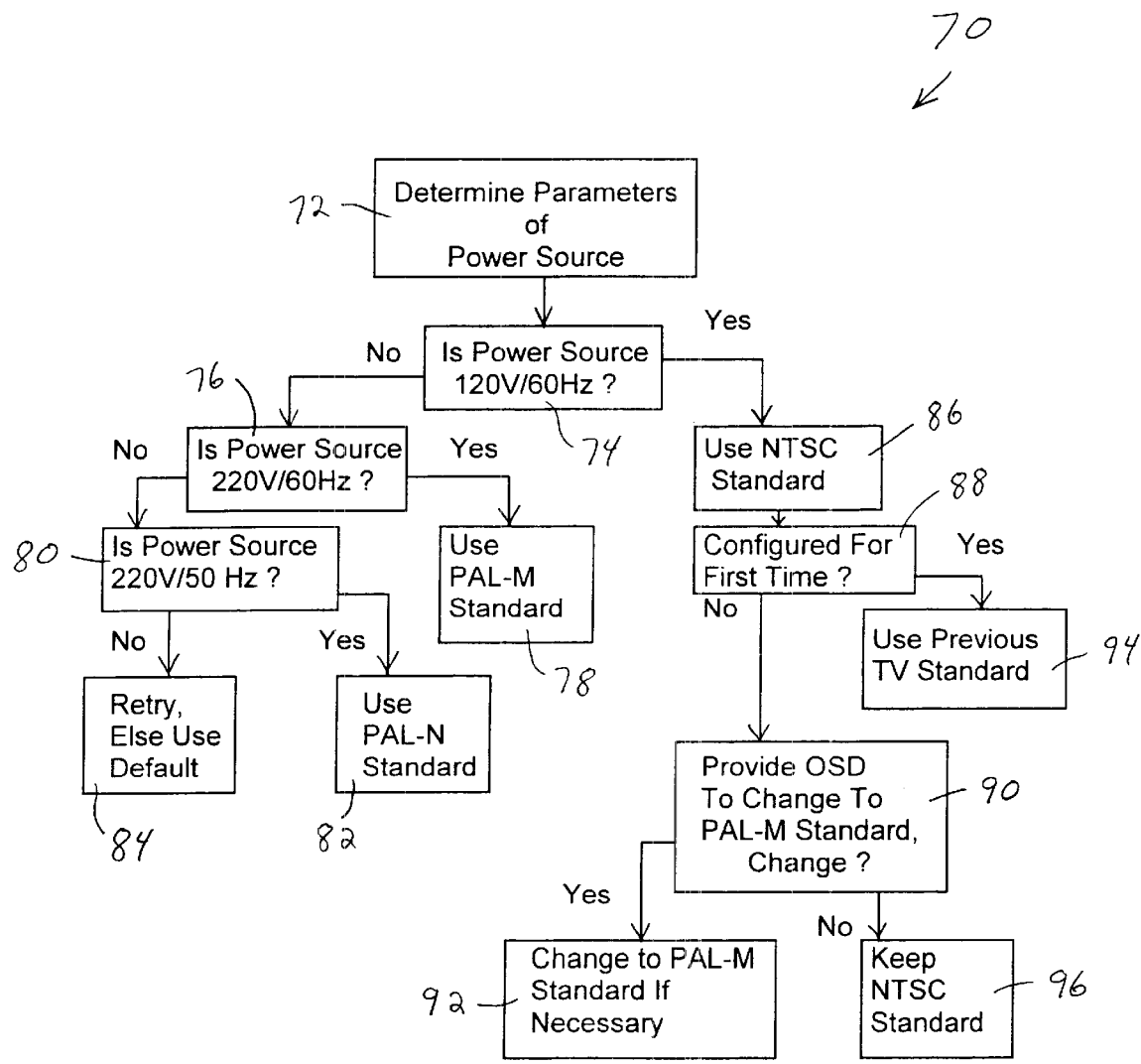
FIG. 4 is a flowchart of another exemplary method for carrying out the principles of the present invention.

Referring to FIG. 4, there is depicted a flow-chart, generally designated 70, that describes another method for determining an appropriate television standard for the television apparatus 18. It should be appreciated that this method is processed and executed by the television apparatus 18 in like manner as the previous method referenced with FIG. 3.

The receiver 14, upon power-up, initially determines parameters (e.g. frequency and voltage) of a power source to which it is coupled and from which it derives its operating power, block 72, as described above. This is typically accomplished when the receiver 14 is powered-up for the first time since it has left the manufacturer.

The receiver 14 determines from the parameters whether the power source is 120V @ 60 Hz, block 74. If the power source is not determined to be 120V @ 60 Hz, a determination is then made from the determined parameters whether the power source is 220V @ 60 Hz, block 76. If so, the receiver uses the PAL-M standard, block 78. If not, the receiver 14 determines if the power source is 220V @ 50 Hz, block 80. If so, the receiver uses the PAL-N standard, block 82. If not, the receiver 14 begins again (retries) or defaults to one of the television standards block 84.

In accordance with an aspect of the present invention, if it is determined in block 74, that the power source is 120V @ 60 Hz, the receiver defaults or uses the NTSC standard, block 86. Thereafter, the receiver 14 determines whether it has been configured regarding the television standard before, block 88. If so, indicating a power failure, interruption, or the like, the receiver 14 uses or defaults to the previously selected/determined television signal standard, block 94.

However, if the receiver 14 has not been configured as determined in block 88, an on-screen display (OSD) message is provided/generated in order for the user to manually change the defaulted NTSC television signal standard to the PAL-M television signal standard, block 90. If the user does not change standards, the receiver remains in the default NTSC standard mode, block 96. If the user desires to change standards, the receiver changes to the PAL-M standard, block 92.

The television signal processor thus utilizes one or more parameters of the supply or source of AC electricity to aid in the determination of a television signal standard. The parameter(s) are used to put the television signal processor in a mode proper for a particular television signal standard or format.

While this invention has been described as having a preferred design and/or configuration, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A television signal processing apparatus comprising:
   means for processing an input television signal in a first format to produce an output television signal in a second format corresponding to one of a plurality of television signal standards;
   means for determining a parameter of a supply of electricity for the television signal processing apparatus; and
   control means responsive to a first determined value of the parameter of the supply of electricity for automatically selecting one of the plurality of television signal standards, and responsive to a second determined value of the parameter of the supply of electricity for enabling a user to manually assist in selecting one of the plurality of television signal standards, wherein the control means controls the signal processing means to produce the output television signal in the second format corresponding to the selected one of the plurality of television signal standards.

2. The television signal processing apparatus of claim 1, wherein said plurality of television signal standards comprise NTSC and PAL standards.

3. The television signal processing apparatus of claim 1, wherein said means for determining a parameter of a supply of electricity for the television signal processing apparatus comprises means for determining frequency and voltage of the supply of electricity of the television signal processing apparatus.

4. The television signal processing apparatus of claim 3, wherein the control means comprises an OSD generator for generating a signal representing on OSD message for enabling a user to manually assist in selecting one of the plurality of television signal standards in response to the second determined value of the parameter of the supply of electricity corresponding to 120 volts @ 60 hertz.

5. The television signal processing apparatus of claim 4 wherein the input television signal comprises a DBS signal.

6. A method for processing a television signal input in a first format in a television signal processing apparatus to produce an output television signal in a second format corresponding to one of a plurality of television signal standards, comprising the steps of:

determining a value of a parameter of a source of operating power of the television signal processing apparatus;

automatically selecting one of the plurality of television signal standards in response to a first value of the parameter;

enabling a user to manually assist with selecting one of the plurality of television signal standards in response to a second value of the parameter; and controlling the television signal processing apparatus to produce the output television signal in the second format corresponding to the selected one of the plurality of television signal standards.

7. The method of claim 6, wherein the step of determining a parameter of the source of operating power comprises determining frequency and voltage of the source of operating power.

8. The method of claim 6, wherein the plurality of television signal standards includes PAL and NTSC standards.

9. The method of claim 6, wherein the input television signal comprises a DBS television signal.

10. The method of claim 6, wherein the step of enabling a user to manually assist with selecting one of the plurality of television signal standards comprises the step of generating an OSD message in response to the second value of the parameter corresponding to 120 volts @ 60 hertz.

* * * * *